US006586136B1

(12) United States Patent
Bhardwaj et al.

(10) Patent No.: US 6,586,136 B1
(45) Date of Patent: *Jul. 1, 2003

(54) LIGHTWEIGHT, LOW RESISTANCE ELECTRODE PLATE FOR LEAD-ACID BATTERIES

(75) Inventors: Ramesh Bhardwaj, Walnut, CA (US); John B. Timmons, Winston-Salem, NC (US); Joseph A. Orsino, San Clemente, CA (US)

(73) Assignee: Concorde Battery Corporation, West Covina, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 09/714,753

(22) Filed: Nov. 16, 2000

(51) Int. Cl.⁷ .............................. H01M 4/68; H01M 4/56
(52) U.S. Cl. ....................................... 429/245; 429/225
(58) Field of Search ................................ 429/225, 245; 29/2

(56) References Cited

U.S. PATENT DOCUMENTS

| | | | | |
|---|---|---|---|---|
| 2,492,206 A | * | 12/1949 | White et al. .................. 205/63 |
| 2,739,997 A | * | 3/1956 | Carrick et al. ............... 429/147 |
| 3,117,893 A | * | 1/1964 | Sundberg ..................... 429/244 |
| 3,884,716 A | | 5/1975 | Walker ......................... 136/26 |
| 4,324,848 A | * | 4/1982 | Will ............................. 429/228 |
| 4,554,228 A | | 11/1985 | Kiessling ..................... 429/242 |
| 4,760,001 A | | 7/1988 | Nann et al. .................. 429/136 |
| RE33,133 E | | 12/1989 | Kiessling ..................... 429/242 |
| 5,045,086 A | | 9/1991 | Juergens ..................... 29/623.1 |
| 5,047,300 A | | 9/1991 | Juergens ..................... 429/94 |
| 5,198,313 A | | 3/1993 | Juergens ..................... 429/94 |
| 5,334,464 A | * | 8/1994 | Rowlette ..................... 429/210 |
| 5,368,961 A | | 11/1994 | Juergens ..................... 429/233 |
| 5,677,078 A | | 10/1997 | Juergens et al. ............. 429/94 |
| 5,820,639 A | | 10/1998 | Snyder et al. ............. 29/623.5 |
| 6,316,148 B1 | * | 11/2001 | Timmons et al. ................ 29/2 |

FOREIGN PATENT DOCUMENTS

GB    1303856    *   1/1973

OTHER PUBLICATIONS

AMP Journal of Technology vol. 1; article entitled Conducting Polymer Blends as Inert Electrodes; James L. Joyce, Jr. et al.; 1991.
AMP Journal of Technology Vo. 5; article entitled Anisotropic Conductive Film with Arrayed Conductive Particles.

* cited by examiner

Primary Examiner—Patrick Ryan
Assistant Examiner—Gregg Cantelmo
(74) Attorney, Agent, or Firm—Womble Carlyle Sandridge & Rice, PLLC

(57) ABSTRACT

Lightweight, low resistance, thin plate for lead-acid electrochemical cells formed primarily of an aluminum foil substrate having a thickness of between about 0.005 inches and 0.030 inches, and a continuous outer layer of lead or lead alloy having a thickness of less than about 0.005 inches and that is corrosive resistant to the electrolytic acid of the battery.

15 Claims, 5 Drawing Sheets

LIGHTWEIGHT, LOW RESISTANCE ELECTRODE PLATE FOR LEAD-ACID BATTERIES

FIELD OF THE INVENTION

The present invention is directed to lead-acid batteries, and particularly to batteries having lightweight, high energy electrochemical cells in which the electrode plates are formed of a foil substrate covered by a continuous, non-corrosive, conductive coating.

BACKGROUND OF THE INVENTION

Small lead-acid electrochemical cells used for example, as the power source for small electronics, flashlights, and the like have previously been made of thin films of lead coated on each side with an electrochemical paste (positive or negative). Cells are completed by stacking or winding alternating positive and negative plates with separators therebetween.

Lead has been predominately used as the plate material in such batteries for a long period of time. While lead is not particularly a good conductor of electricity, it is inherently resistant to the corrosive effect of the electrolytic acids. Other, more conductive metals are either too expensive to be used as the electrode for lead-acid batteries, or else they are quickly corroded during the charging action by the electrolytic acids. Therefore lead has remained as the predominant material. Lead is also very heavy, and in applications where weight or increased conductivity is a factor, other alternatives have long been sought.

In previous attempts, one approach has been to plate lead onto other more conductive metals or metal alloys such as aluminum and copper. Copper is sixteen times as conductive as lead and weighs only about 70% as much. Aluminum, on the other hand has a specific gravity of only 20%–25% of lead and approximately eight times the conductivity of lead. Obviously, from the standpoint of weight and conductivity, copper and aluminum are good candidates to replace lead as the substrate for electrodes. However both materials are very susceptible to corrosion in the presence of sulfuric acid, and cannot be used as the positive electrode in a lead acid battery if left unprotected. Either material can be used as the negative electrode, and copper has in the past. The conventional manner for plating lead is from an aqueous solution. When lead is plated from an aqueous solution, for one reason or another, the coatings are porous, and the sulfuric acid will quickly penetrate the coatings and attack the aluminum or copper. In such instances, and without any other treatment of the plated lead layer, the copper and aluminum plates have not survived the charging operation. As a result, aluminum based substrates with lead applied in such a manner have not succeeded in the past.

SUMMARY OF THE INVENTION

The present invention is directed toward reducing the weight per unit mass and improving the conductivity of the electrochemical cell by replacing the lead or lead alloy film therein with a lighter weight, low resistance, conductive material that is coated with or plated by lead or some other conductive coating. Further, the outer lead coating is accomplished in a manner that protects the non-lead film substrate from the corrosive effect of the electrolytic acid in the cell. Toward this end, the present invention is an electrode plate for a lead-acid electrochemical cell formed primarily of a lightweight foil or film substrate coated with a layer of conductive, but corrosive resistant material such as lead. The foil has a thickness of between about 0.005 inches and 0.030 inches. The use of a lightweight foil, such as aluminum, as a current collector substrate has numerous advantages compared to conventional lead or lead alloy current collectors. Specifically, a lighter current collector means a higher specific energy (WH/KG) for lead acid batteries. Since aluminum has a much higher conductivity, or lower resistivity, compared to lead or lead alloys, it facilitates fast formation and fast charging of the battery due to reduced ohmic losses. As a current collector, aluminum also delivers higher power compared to lead, an important factor in applications involving high current discharges. An aluminum foil current collector ensures higher utilization of the electrode material as a result of improved current distribution within the electrodes. Other, lightweight, relatively lower resistively foils such as copper, nickel, tin, silver, or magnesium may also be used as the substrate.

One embodiment of the present invention utilizes an aluminum foil substrate coated with an outer layer of corrosive resistant material such as lead or a lead alloy. To ensure that the outer conductive layer suitably protects the aluminum substrate from attack by the electrolytic acid, the outer layer may be sealed by any one of several conventional means including immersing the plate in a heated non-aqueous liquid such as peanut or canola oil at a temperature that causes any pores in the conductive outer layer to close and seal. While the aluminum substrate may be coated directly in the manner described herein, the lead coating should desirably be about 0.001–0.005 inches thick to provide corrosion protection for the substrate.

If desired, an intermediate corrosion prevention layer may be formed between the aluminum foil substrate and the lead outer coating to provide further corrosion protection for the underlying substrate. Where the intermediate layer is applied, the lead outer coating of the present invention may be reduced to about 0.001 inches to 0.002 inches. The added thin corrosion prevention layer further provides the advantage of providing a strong bonded structure, resulting in an extended battery life.

The continuous outer layer of lead or lead alloy is applied by dipping the coated foil in a molten lead or lead alloy, immersing the foil in a molten salt solution, electroplating, vacuum deposition, spray deposition, or plasma deposition. However, other plating techniques conventional in the art may also be used depending upon the degree of sealing desired in the outer conductive layer.

The electrode plates of the present invention may be subsequently cut into strips of desired width and length and coated with conventional negative or positive pastes to create corresponding negative or positive electrodes. These electrodes may be utilized in any number of battery cell configurations. Alternating positive and negative electrode plates are generally separated by a separator such as a thin glass mat and arranged in a conventional parallel plate arrangement. Since the electrodes are flexible and quite thin in construction, alternating positive and negative plates may also be separated by a thin glass separator and rolled or coiled in a cylindrical or oblong configuration. Alternatively, the thin plates may be fan-folded in an accordian fashion to create a cell configuration of desired thickness having enhanced structural stability.

DESCRIPTION OF THE PREFERRED EMBODIMENTS

Figure 1A:
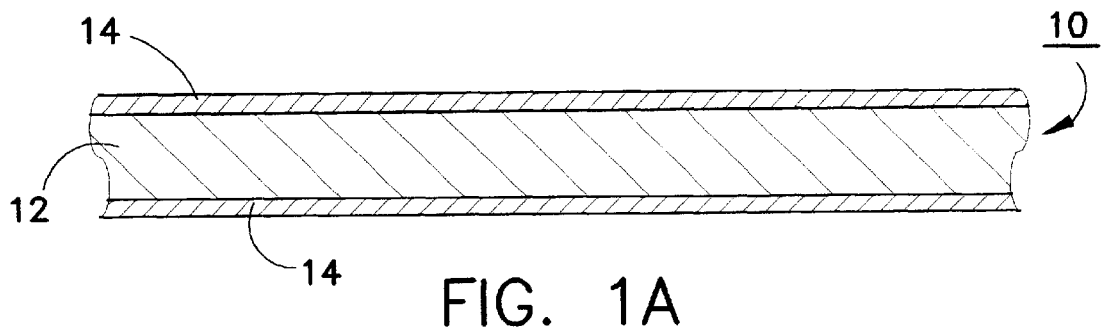
FIG. 1A is a cross-sectional view of an electrode plate according to the present invention with an aluminum foil substrate and a continuous outer layer of conductive material.

Referring now to FIG. 1A, there is illustrated a plate, generally referred to as 10, for forming either a positive or negative electrode for a lead-acid batter cell. Toward this end, plate 10 is formed by an aluminum foil substrate 12 which serves as a lightweight, low-resistance, current collector covered on either surface by a lead or lead alloy protective coating. "Foil" or "Film" as used herein means a sheet of conductive material that does not have sufficient stiffness to be self-supporting and cannot be self-supporting if stood on one edge.

The aluminum foil substrate 12 is between about 0.005 inches and 0.030 inches thick and may be coated on each side directly with an outer protective coating 14 of lead or lead alloy by any of the conventional means of applying such an outer layer. The lead or lead alloy (lead/tin for example) coating should have a thickness of no greater than 0.005 inches and preferably 0.003–0.005 inches. However, because outer coating 14 may exhibit some degree of porosity, layer 14 is desirably sealed by immersing plate 10 in a non-aqueous liquid bath to melt and seal any penetrations. One such non-aqueous liquid that has proven effective in sealing such outer layers is peanut oil at a temperature sufficiently hot to cause the lead or lead alloy to flow, which closes the pores. "Flow," as used herein, refers to the condition where the outer layer 14 exhibits fluidity.

While the preferred embodiment described herein is directed to aluminum as the substrate material, other materials lighter than lead and having a higher conductivity than lead are also envisioned. Such materials include copper, magnesium, tin, nickel, and silver. Further, any foil material that exhibits a specific gravity of less than 11 and a resistivity of less than 14 micro ohms would be acceptable. For example, a polymeric film coated with a layer of graphite will serve as an appropriate substrate. The following table provides the specific gravities and resistivities of relevant materials for purpose of comparison:

|    | MATERIAL  | SPECIFIC GRAVITIES | RESISTIVITY IN (U-OHMS COM) |
|----|-----------|--------------------|-----------------------------|
| a. | Lead      | 11.35              | 22                          |
| b. | Aluminum  | 2.7                | 2.68                        |
| c. | Copper    | 8.9                | 1.72                        |
| d. | Magnesium | 1.74               | 3.9                         |
| e. | Nickel    | 8.9                | 6.9                         |
| f. | Silver    | 10.5               | 1.63                        |
| g. | Tin       | 7.3                | 12.6                        |

Figure 1B:
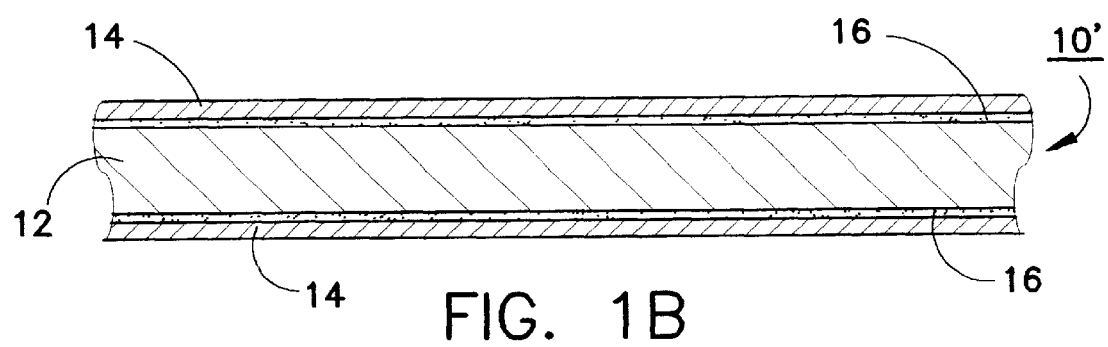
FIG. 1B is a cross-sectional view of an alternative embodiment of an electrode plate with an aluminum foil substrate, a corrosion prevention layer, and a continuous outer layer of conductive material.

Turning now to FIG. 1B, an alternative plate construction 10' is a multi-layer construction used for forming an electrode plate. Plate 10' comprises a aluminum foil substrate 12 and outer lead or lead alloy coating 14 on both sides as in the first embodiment, plus a thin intermediate, auxiliary corrosion prevention layer 16. Substrate 12 may be formed of other materials which are lighter than lead and have a higher conductivity such as copper, tin, nickel, silver, or magnesium. Layer 16 may be nickel, silver, or gold. The additional corrosion protection layer 16 is approximately 0.00005–0.0005 inches thick and provides a substantially higher degree of corrosion prevention, while allowing outer layer 14 to be reduced in thickness to between about 0.001 inches and 0.002 inches.

As a result, the electrode plates, according to the present invention, have a total thickness in the range of 0.007 inches–0.041 inches.

To form the multi-layer construction of FIG. 1B, aluminum foil substrate 12 is first plated with corrosion protection layer 16 which prepares plate 10' to receive outer layer 14. By way of example, the steps for applying a layer 16 of nickel are described herein; however, the steps for applying the other suitable metals are substantially similar and known in the art. Aluminum foil substrate 12 is first soak cleaned at about 160 degrees F. for 3 to 5 minutes in an alkaline solution to remove any organic impurities from the surface. After the soak, the foil is rinsed in de-ionized water. Substrate 12 is then hot acid etched at about 130 degrees F. in diluted sulfuric acid to remove any oxide layer completely from the surface. The etching time depends on the thickness of oxide present on the foil. The acid etch is followed by a water rinse to clean the acid residue. The cleaned foil substrate 12 is immersed in a mixture of triacid (50% HNO3+25% H2SO4+25% water) to remove an impurities left by the acid etch. Next, the substrate 12 is immersed in a zinc solution for 30 to 60 seconds where zinc is deposited on the surface of substrate 12. While applying the zinc coating in a single step provides sufficient preparation of substrate 12, repeating the coating better prepares the aluminum for a more uniform coating of nickel. Thus, initial layer of zinc is stripped away using a 30% nitric acid solution at room temperature for approximately 20 seconds and then rinsed with water. Aluminum substrate 12 is then coated with zinc again in a zinc solution. Substrate 12 is now ready for plating with nickel. For electroless plating, the aluminum substrate 12 is immersed in an electroless nickel solution at 185 degrees F. for a period of between 1 minute and 10 minutes, depending on the thickness of nickel layer 16 desired. This process removes the zinc from the foil and plates the nickel. Layer 16 is then rinsed with water to remove any residue. The substrate 12 with nickel layer 16 is activated using a nickel strike just before applying outer layer 14. This involves immersing the coated substrate in a mixture of nickel chloride and a 10% solution of hydrochloric acid at room temperature for 1 to 2 minutes and then rinsing with water.

Substrate 12 with nickel layer 16 is then coated with a thin layer (0.001 inches to 0.002 inches) of lead or lead alloy 14 using one of several methods, including dipping or immersion in a molten salt solution, electroplating in a fused salt bath, electroplating in a fluoroborate bath, laminated onto the substrate or by vacuum, spray, or plasma deposition. For example, the nickel-coated substrate may be immersed in a molten lead or lead alloy bath at temperatures ranging from 900 degrees F. to 960 degrees F. for 2–10 seconds to get the desired thickness. Following application of outer layer 14, layer 14 may be sealed as described hereinabove; however, sealing is not a requirement because of the protection provided by corrosion prevention layer 16 in the present embodiment.

Figure 1C:
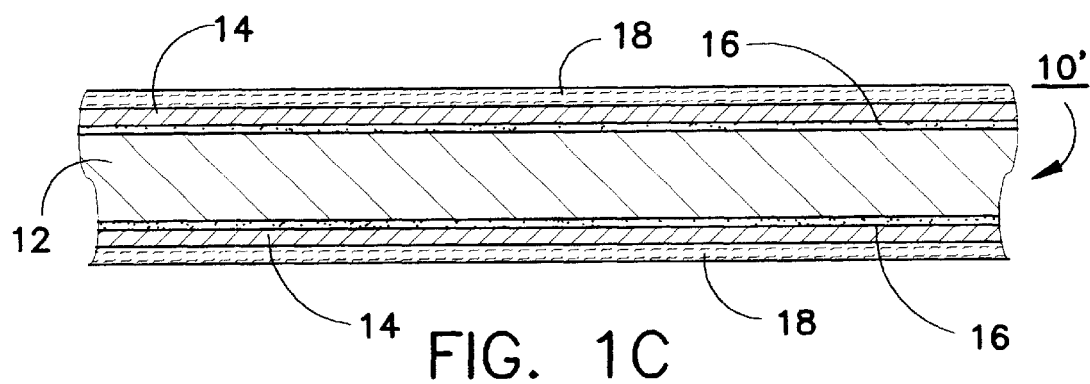
FIG. 1C is a cross-sectional view of the electrode plate of FIG. 1B, further including a layer of electrochemically active paste on each side.
Figure 2:
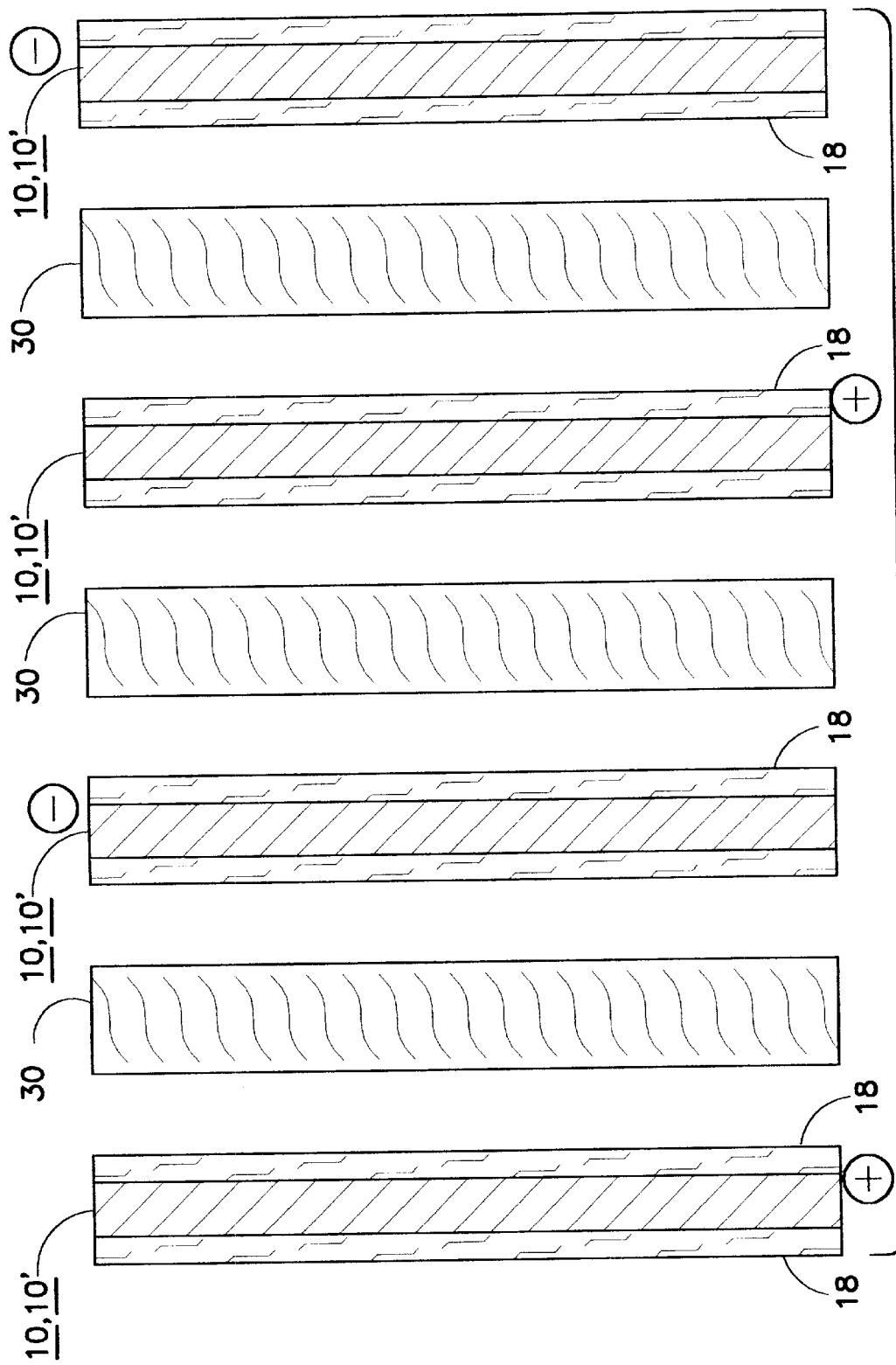
FIG. 2 is a schematic representation of positive and negative electrode plates constructed according to the present invention separated by glass mat separators.

Referring to FIG. 1C, the plate 10 or 10' is later coated with a lead sulfate paste 18 in a conventional manner to a thickness of between 0.001 inches and 0.020 inches to form either a negative or positive electrode upon charging. As best seen in FIG. 2, alternating positive and negative electrode plates 10, 10', each having unpasted end portions, may be formed into a battery cell having a parallel plate arrangement by separating the alternating plates with a thin glass mat separator 30 known in the art. The unpasted end portions form the respective negative and positive terminal connections.

Figure 3:
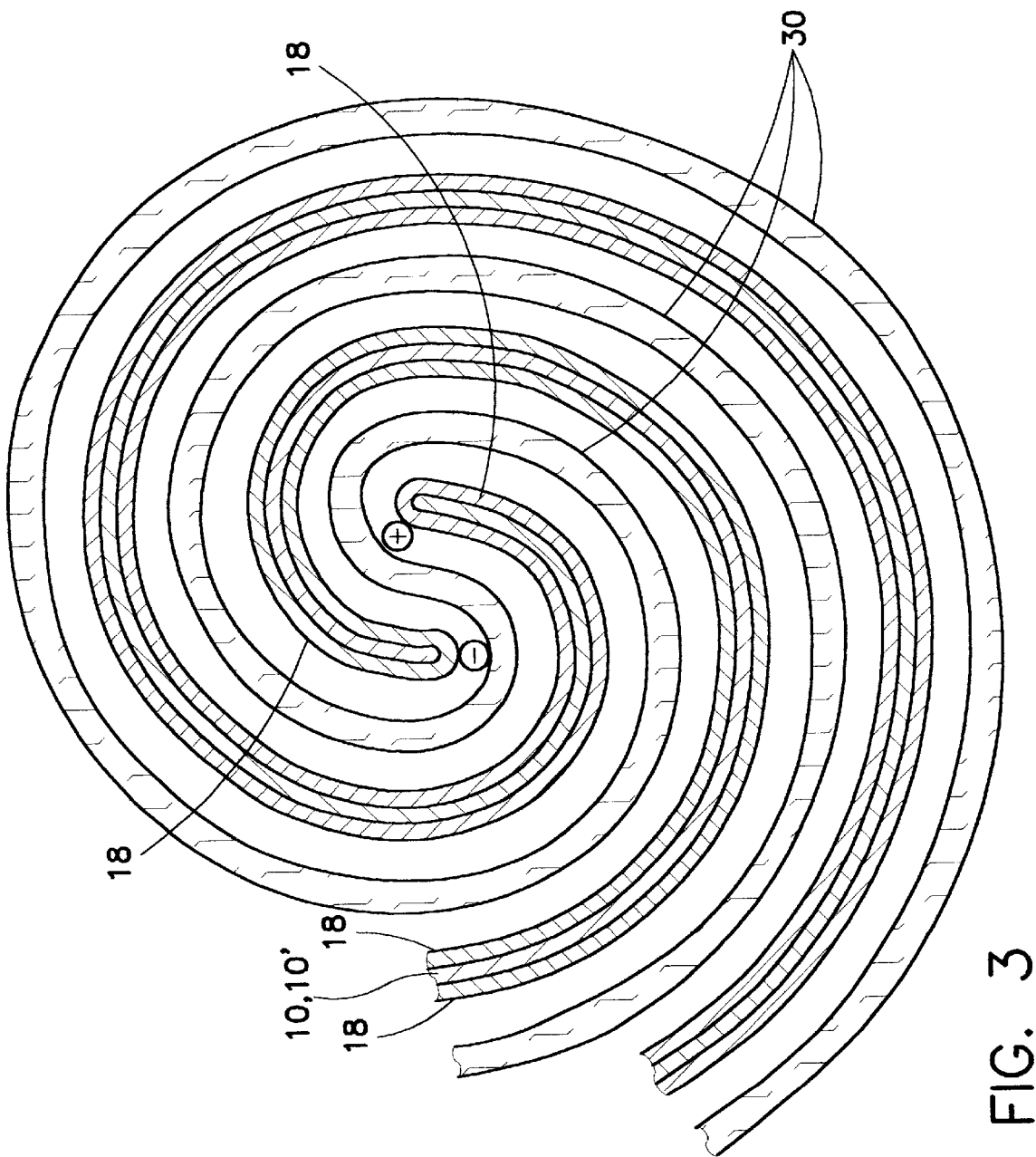
FIG. 3 is a schematic representation of positive and negative electrode plates and glass mat separators formed in a spiral arrangement.
Figure 4:
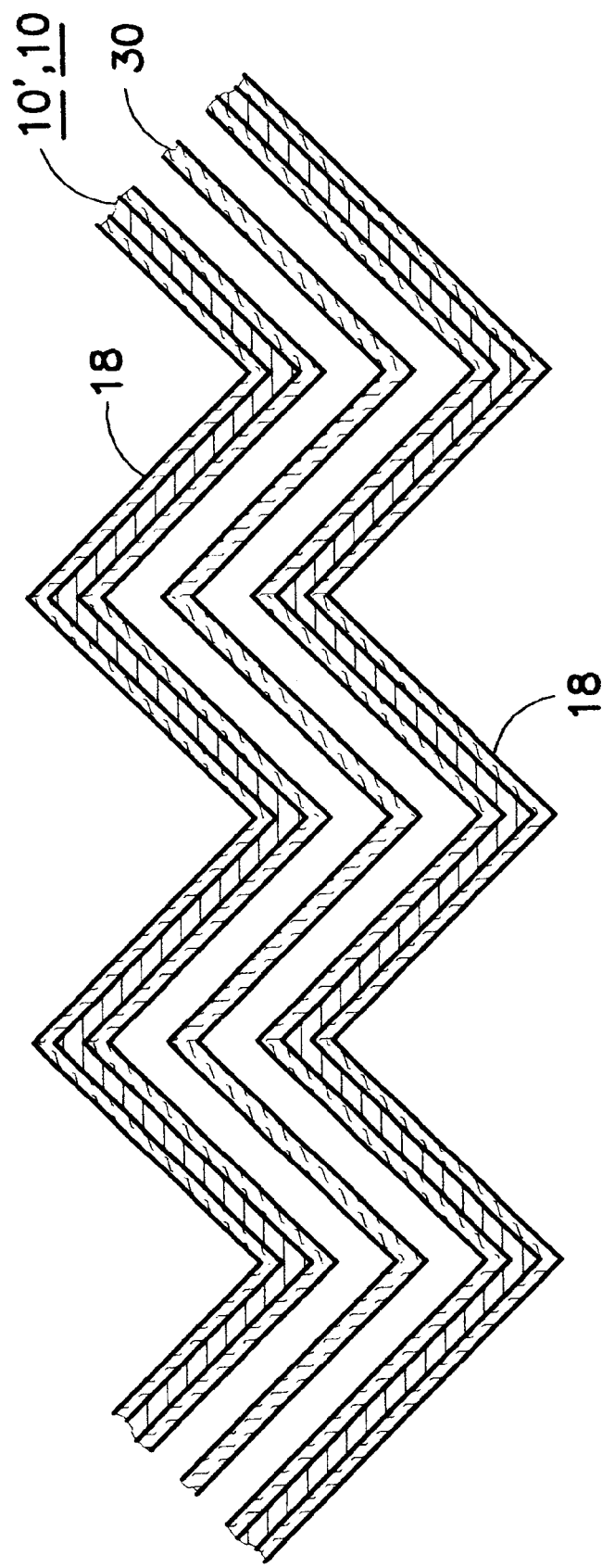
FIG. 4 is a schematic representation of a battery cell construction according to one embodiment of the present invention with a folded plate formation.
Figure 5:
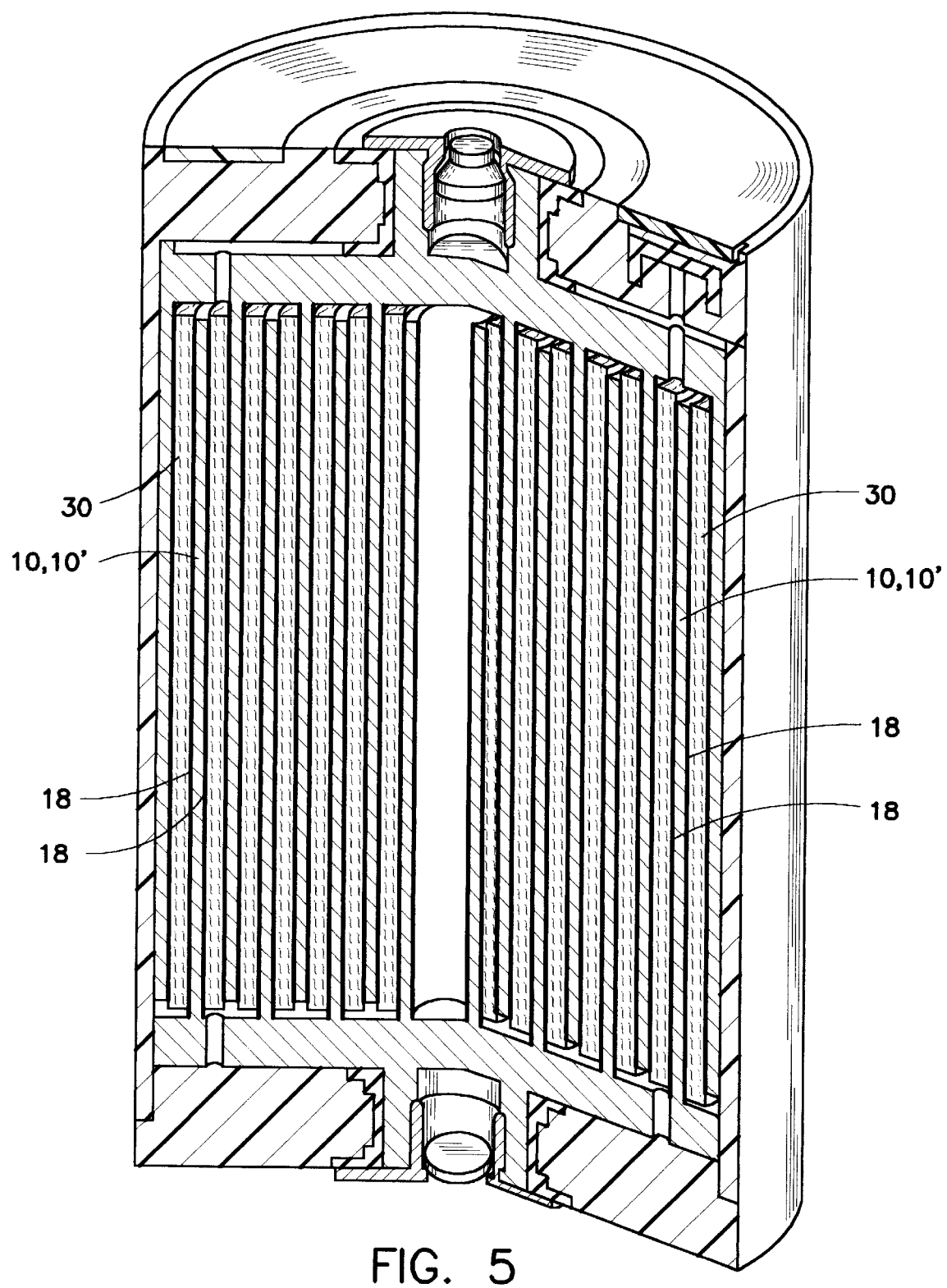
FIG. 5 is a cross-sectional view illustrating an alternative battery cell construction in a spirally formed cell construction with an exaggerated spacing between the plates and the separators.

FIGS. 3 and 5 illustrate how the thin alternating and separated electrode plates of the present invention may be rolled or coiled to form an alternative battery arrangement, such as that of a conventional D-size flashlight battery. Because of their thin, lightweight construction, plates 10, 10' may be formed in configurations too numerous to be completely described herein. For example, as shown in FIG. 4, pasted plates 10, 10' with thin glass mat separators 30 may be fan-folded in an accordion fashion to achieve a battery cell configuration of a desired thickness, while creating an enhanced cell structural stability.

Certain modifications and improvements will occur to those skilled in the art upon a reading of the foregoing description. It should be understood that all such modification and improvements, while not discussed in detail hereinabove, are properly within the scope of the following claims.

We claim:

1. A lightweight monopolar electrode for a lead acid electrochemical cell comprising:
   (a) a plate formed of:
      i) a lightweight, low resistivity foil substrate having a thickness of between about 0.005 inches and 0.030 inches, said foil substrate;
      ii) a continuous outer protective layer of lead containing material, said outer layer having a thickness of less than about 0.005 inches;
   (b) said layer of lead containing material being so applied as to prevent attack by corrosive electrolytic acids, and
   (c) a layer of active paste applied over a substantial portion of said continuous outer layer of lead containing material.

2. The electrode according to claim 1 wherein said substrate is formed of a material selected from the group consisting of aluminum, copper, magnesium, nickel, tin, and silver.

3. The electrode according to claim 1 further including an additional corrosion protective layer applied to said foil substrate between said substrate and said continuous outer layer.

4. The electrode according to claim 3 wherein said additional protective layer is formed from material selected from the group consisting of nickel, silver, and gold.

5. The electrode of claim 3 wherein and further including said additional protective layer is applied by selecting from the group consisting of electroless plating and electroplating.

6. The electrode according to claim 3 wherein said continuous outer protective layer is deposited on said additional protective layer by selecting from the group of process steps consisting of dipping, electroplating, vacuum deposition, spray deposition, and plasma deposition.

7. The electrode according to claim 6 wherein said continuous outer protective layer is lead.

8. The electrode according to claim 1 wherein the foil substrate is formed of a material having a specific gravity of less than 11 and a resistivity of less than 14 micro ohms.

9. A lead-acid battery having at least one electrochemical cell formed of at least one set of alternating monopolar electrodes, one of the set being a current collecting electrode, housed in a compartment containing electrolyte, wherein at least the current collecting electrodes comprise:
   (a) a plate formed of:
      (i) a lightweight, low resistivity foil substrate having a thickness of between about 0.005 inches and 0.030 inches, said foil substrate;
      (ii) a continuous outer layer of lead containing material, said outer layer having a thickness of less than about 0.005 inches;
   (b) said layer of lead containing material being so applied as to prevent attack by corrosive acids in the electrolyte, and
   (c) a layer of electrochemically active paste applied over a substantial portion of said continuous outer layer of lead containing material, said active paste selected from the group of materials consisting of negative paste and positive paste.

10. The lead-acid battery of claim 9 wherein said substrate is formed of a material selected from the group consisting of aluminum, copper, magnesium, nickel, tin, and silver.

11. The lead acid battery of claim 9 wherein an additional corrosion prevention layer is applied to said foil substrate between said substrate and said continuous outer layer.

12. The electrode according to claim 11 wherein said additional corrosion prevention layer is formed from material selected from the group consisting of nickel, silver, and gold.

13. The electrode of claim 11 wherein said corrosion prevention layer is applied by selecting from the group of process steps consisting of electroless plating and electroplating.

14. The electrode according to claim 11 wherein said lead layer is deposited on said additional corrosion prevention layer by selecting from the group consisting of dipping, electroplating, vacuum deposition, spray deposition, and plasma deposition.

15. The lead-acid battery of claim 9 wherein the foil substrate is formed of a material having a specific gravity of less than 11 and a resistivity of less than 14 micro ohms.

* * * * *